March 10, 1964 R. P. GEOFFRION ETAL 3,124,248

COMPONENT PACKAGE

Filed Sept. 25, 1961

INVENTORS
RICHARD P. GEOFFRION
CHARLES L. CONLEY
BY
Kenway, Jenney & Hildreth
ATTORNEYS 3,124,248

COMPONENT PACKAGE

Richard P. Geoffrion, Lexington, and Charles L. Conley, Reading, Mass., assignors to Clevite Corporation, a corporation of Ohio Filed Sept. 25, 1961, Ser. No. 140,291
3 Claims. (Cl. 206—65)

This invention relates in general to packaging and in particular to packaging for small components.

Packaging of small components where protection against shock, breakage, or distortion is required has been the subject of considerable investigation and development. In the case of such devices as miniature diodes, numerous expedients have been employed. Early in the use of such products, simple bulk shipments were made, but these were soon recognized to be totally unsatisfactory. Later, diodes were mounted by means of tabs on paperboard strips for shipment, but the degree of protection afforded was relatively slight.

The problem of suitable packaging of diodes has been aggravated by various customer requirements of recent origin. In many instances, these requirements of the customer extend beyond the usual electrical and physical characteristics even to such formerly unimportant details as the length and angle of bend of the leads. It is, of course, quite feasible in the manufacturing process to cut leads to any desired length and to bend them to any angle to suit the application to which the devices are to be put. The bends are made to very close tolerances usually, and it is necessary that these tolerances be preserved until the actual utilization of the devices. It is obvious that bulk packing or mounting on paper strips do not provide the protection which is required.

Therefore, it is a primary object of the present invention to improve the packaging of small components.

It is another object of the present invention to enclose electrical components for shipment and use in such a manner that no distortion of the component or its leads may occur.

It is another object of the present invention to package quantities of electrical components such that suitable protection is provided to components remaining in unused portions of a given package.

It is still another object of the present invention to permit the removal of portions of a given package without loss of protection to the devices in the portions removed or in the remainder of a package.

It is a further object of the present invention to provide a shock-proof container for diodes in which the leads of the device are supported out of contact with the package.

It is a still further object of the present invention to facilitate the use and handling of packaged diodes.

In general, the present invention is organized about a block of material and an enclosing sleeve. One surface of the block is channeled or grooved to provide support saddles on which are mounted electrical components such as diodes. The block is inserted in the sleeve which conforms closely in internal dimensions to the outside dimentions of the block. The inner surface of the sleeve bears upon and retains the components in place of their suspension saddles. The block of material is made preferably of a light substance such as expanded polystyrene foam, although other materials may be used without loss of certain of the features of the invention. The sleeve which surrounds the block may conveniently be made of paperboard, or any one of numerous other materials such as acetate. The latter may sometimes be preferred because of its transparency which permits inspection of the devices without opening the package.

The block of material is preferably partially cut through as by deep notching at a number of points along its length to permit desired lengths carrying any suitable number of components to be broken away from the body of the block. At corresponding points along the length of the sleeve, the sleeve may be scored to permit it to be broken away with a similar length of the block. In this fashion, the protection afforded by the sleeve to components mounted on the block is retained, not only for those components in the portions broken off, but also for those in the remainder. For a better understanding of the present invention, together with other and further objects, features and advantages, reference should be made to the following detailed description which should be read in conjunction with the appended drawing, in which:

Figure 1:
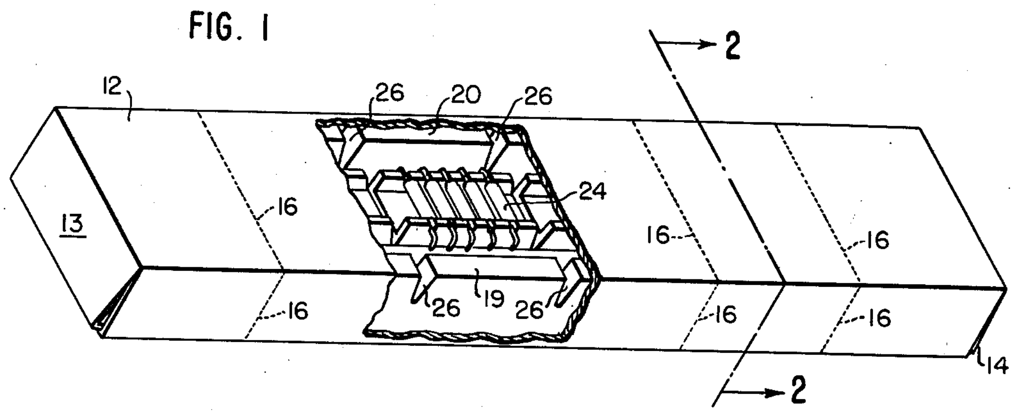
FIG. 1 is a perspective view of a complete package, the outer enclosure being partially cut away to show the disposition of components.
Figure 3:
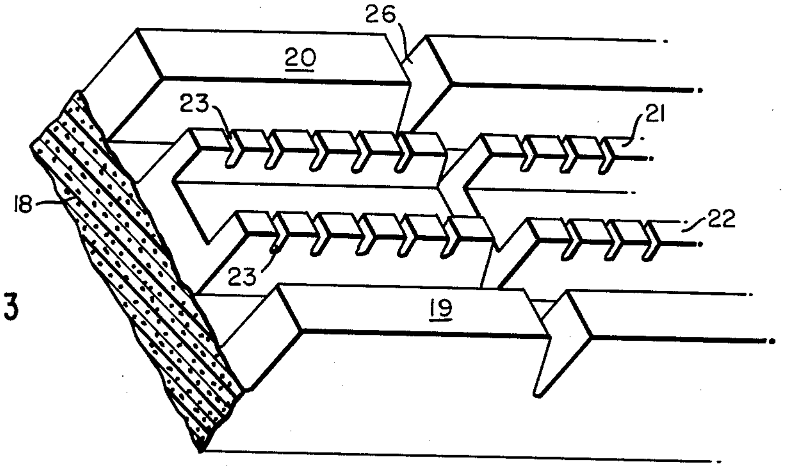
FIG. 3 is a perspective view of a section of the block on which the components may be mounted.

Referring to FIGS. 1 and 3, one may see a sleeve 12 of rectangular cross-section. The sleeve is provided with end closures 13 and 14 which are made in the same manner as in a conventional paperboard box. They are simple extensions of a sleeve surface bent to conform with the end areas of the package and may include a tapered tongue for insertion between the block and the sleeve to hold the end closures in position. At a number of intervals along the length of the sleeve, the sleeve is scored on all four sides as at 16.

Within the sleeve is a block of expanded polystyrene foam 18, on the upper surface of which are formed three parallel channels or grooves. Forming the outer sides of the grooves are relatively wide walls 19 and 20, which are of a height very nearly approximating that of the inside of the sleeve. Separating the three grooves are two additional relatviely narrow device-supporting walls 21 and 22 which for a saddle for the support of components. The walls forming the saddle are somewhat lower than the outer walls, and they are formed with a number of aligned notches 23 for accommodating components such as diodes 24 at equally spaced points along their length. These details are more easily seen in a subsequent figure and are described in greater detail below.

Figure 2:
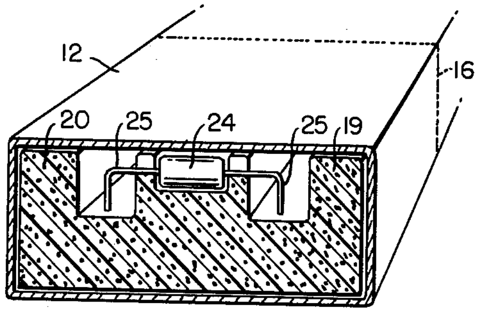
FIG. 2 is a cross-section of the embodiment shown in FIG. 1, taken along the lines 2—2.

In the sectional view of FIG. 2, a typical diode 23 is illustrated in the aligned notches of the saddle formed by the walls 21 and 22. Extending outwardly from the notches of the saddle are leads 25. These leads are bent to precise dimensions and configurations, and they are bent downwardly to extend into the channels formed adjacent the walls 19 and 20. It will be noted that the channels adjacent the outer walls are of sufficient width and depth that the leads do not contact the block at any point. Across the top, or channeled surface, of the block, one side of the sleeve 12 passes. The sleeve bears lightly upon the body portion of the diodes and retains them in the notches.

In FIG. 3, the configuration of the block is clearly shown. Deep V notches 26 are cut through the block to a depth of about one-half the thickness of the block or more. These notches extend across the entire upper surface and are spaced each from the next by an amount equal to the spacing between the score lines 16 on the sleeve 12. The spacing between the deep V notches 26 is dictated by the number of diodes that it is desired to use at each operation. The spacing between score lines on the sleeve is, of course, chosen to match that of the V notches. In the block shown, enough shallow notches 23 are formed in the walls 21 and 22 to accommodate five diodes in each break-away section although any other reasonable number might be chosen.

As is plain from the foregoing description, the ultimate user of the diodes simply breaks from the unopened package as many sections as he may wish to use at a given time. Since the sleeve and block are broken away together, protection afforded by the package is retained for diodes broken away as well as those remaining in the package. Furthermore, the nature of the suspension of the diode is such that the packing is highly resistant to physical shock, and the leads are unable to contact any surface which might cause unwanted distortion or bending of the leads.

It has been noted that the materials presently preferred for the package are expanded polystyrene foam for the block and paperboard for the sleeve. However, numerous other materials may be used with success and, in some cases, with additional features such as the transparency which would be provided by an acetate sleeve. The paperboard has at its principal advantages its lower cost and ease of fabrication. Insofar as the block is concerned, the expanded polystyrene foam is of value chiefly because of its extreme light weight and its contribution to the shock-proof nature of the total package. Other alternatives will suggest themselves to those skilled in the art upon a reading of the foregoing specification, and accordingly, the invention should not be limited to the details shown and described, but only by the spirit and scope of the appended claims.

What is claimed is:

1. A package for semiconductor diodes having generally cylindrical bodies and end leads extending outwardly along the axes of said bodies for a first portion of their length and extending at an angle to said axes for the remainder of their length comprising a generally rectangular block of material having three grooves formed longitudinally in a surface thereof, said grooves being separated by two central walls, said central walls having a plurality of aligned notches formed therein, each said first portion of said leads being disposed in one of said notches, said diode bodies being thus suspended above the central groove of said three grooves and a sleeve closely fitted over said block and bearing on said bodies to retain said first lead portions in said notches.

2. A package for semiconductor diodes as defined in claim 1 wherein said block of material is deeply notched at predetermined points along its length and said sleeve is scored at corresponding points along its length to permit portions of said block and said sleeve to be broken away from the remainder thereof without disturbing the mounting of said diodes.

3. A package for semiconductor diodes as defined in claim 2 wherein said block is composed of expanded polystyrene.

References Cited in the file of this patent

UNITED STATES PATENTS

| | | |
|---|---|---|
| 2,135,134 | Ehlers | Nov. 1, 1938 |
| 2,205,437 | Ringler | June 25, 1940 |
| 2,339,555 | Glass | Jan. 18, 1944 |
| 2,518,450 | Cowen et al. | Aug. 15, 1950 |
| 2,792,111 | Ringler et al. | May 14, 1957 |
| 2,839,188 | Cipriani et al. | June 17, 1958 |
| 2,941,662 | Osberg | June 21, 1960 |
| 2,949,182 | Williams | Aug. 16, 1960 |
| 2,994,425 | Honeycutt | Aug. 1, 1961 |

OTHER REFERENCES

Modern Packaging, February 1957, pages 121–123, Molded Expanded Polystyrene.